(12) United States Patent
Schelberg et al.

(10) Patent No.: US 8,025,322 B2
(45) Date of Patent: Sep. 27, 2011

(54) BUMPER COVER ATTACHMENT METHOD

(75) Inventors: David William Schelberg, Birmingham, MI (US); Mingher Fred Shen, Ann Arbor, MI (US)

(73) Assignee: Toyota Motor Engineering & Manufacturing North America, Inc., Erlanger, NY (US)

( * ) Notice: Subject to any disclaimer, the term of this patent is extended or adjusted under 35 U.S.C. 154(b) by 196 days.

(21) Appl. No.: 12/143,276

(22) Filed: Jun. 20, 2008

(65) Prior Publication Data

US 2009/0315347 A1 Dec. 24, 2009

(51) Int. Cl.
*B60R 19/24* (2006.01)

(52) U.S. Cl. .......... 293/155; 293/121; 293/122

(58) Field of Classification Search .......... 293/155, 293/132, 102, 154, 120, 121, 122; 296/193.09, 296/203.02; *B60R 19/24*
See application file for complete search history.

(56) References Cited

U.S. PATENT DOCUMENTS

| | | | |
|---|---|---|---|
| 1,670,737 A | 5/1928 | Muser | |
| 4,721,333 A * | 1/1988 | Morio | 293/146 |
| 5,066,057 A * | 11/1991 | Furuta et al. | 293/121 |
| 5,108,138 A * | 4/1992 | Kawaguchi | 293/120 |
| 5,226,695 A * | 7/1993 | Flint et al. | 296/191 |
| 5,957,512 A * | 9/1999 | Inada et al. | 293/102 |
| 5,984,389 A * | 11/1999 | Nuber et al. | 293/109 |
| 6,139,044 A | 10/2000 | Smith et al. | |
| 6,698,808 B2 | 3/2004 | Burkhardt et al. | |
| 6,769,727 B2 | 8/2004 | Delavalle et al. | |
| 7,303,219 B2 * | 12/2007 | Trabant et al. | 293/155 |
| 2003/0184100 A1* | 10/2003 | Turner | 293/155 |
| 2006/0043745 A1 | 3/2006 | Matsuzawa | |
| 2006/0125253 A1* | 6/2006 | Trabant et al. | 293/155 |
| 2006/0249987 A1 | 11/2006 | Kroll | |
| 2007/0210590 A1 | 9/2007 | Gouillart et al. | |

FOREIGN PATENT DOCUMENTS

DE 41 18 614 10/1992

* cited by examiner

*Primary Examiner* — Glenn Dayoan
*Assistant Examiner* — Sunsurraye Westbrook
(74) *Attorney, Agent, or Firm* — Dinsmore & Shohl LLP

(57) ABSTRACT

Embodiments of methods for attaching and upper bumper cover and a lower bumper cover to a vehicle comprise providing a vehicle body and a bumper fascia coupled to the vehicle body, attaching the upper bumper cover to the vehicle body at a position at least partially covering the bumper fascia, at a position above the bumper fascia, or combinations thereof, and attaching the lower bumper cover to the vehicle body at least partially cover the bumper fascia, wherein the lower bumper cover is coupled to and disposed underneath the upper bumper cover.

20 Claims, 4 Drawing Sheets

BUMPER COVER ATTACHMENT METHOD

TECHNICAL FIELD

Embodiments of the present invention are generally directed to bumper assemblies on a vehicle, and are specifically directed to methods of attaching bumper assemblies comprising upper and lower bumper covers to a vehicle body.

BACKGROUND

Improved styling and appearance are continual goals in vehicle design and development. In conjunction with these new vehicle designs, vehicle designers are developing new bumper assemblies which improve aesthetic appeal. For example, some new bumper assemblies may minimize the size of lamp units above the bumper fascia, thus improved bumper covers which eliminate the gaps between the lamp unit and the bumper fascia are desirable.

SUMMARY

According to one embodiment, a method of attaching and upper bumper cover and a lower bumper cover to a vehicle is provided. The method comprises providing a vehicle body and bumper fascia coupled to the vehicle body, attaching the upper bumper cover to the vehicle body at a position at least partially covering the bumper fascia, at a position above the bumper fascia, or combinations thereof, and attaching the lower bumper cover to the vehicle body at least partially cover the bumper fascia, wherein the lower bumper cover couples to is and disposed underneath the upper bumper cover.

According to a further embodiment, the upper bumper cover comprises a lower retaining member and side retaining member. To facilitate attachment of the upper bumper cover to the side retaining member, the side retaining member of the upper bumper cover receives fastening inserts of the side member. To facilitate attachment of the upper bumper cover to the lower bumper cover, the lower retaining member of the upper bumper cover receives fastening inserts of the lower bumper cover.

These and additional features provided by the embodiments of the present invention will be more fully understood in view of the following detailed description, in conjunction with the drawings.

BRIEF DESCRIPTION OF THE DRAWINGS

The following detailed description of specific embodiments of the present invention can be best understood when read in conjunction with the drawings enclosed herewith.

Figure 1:
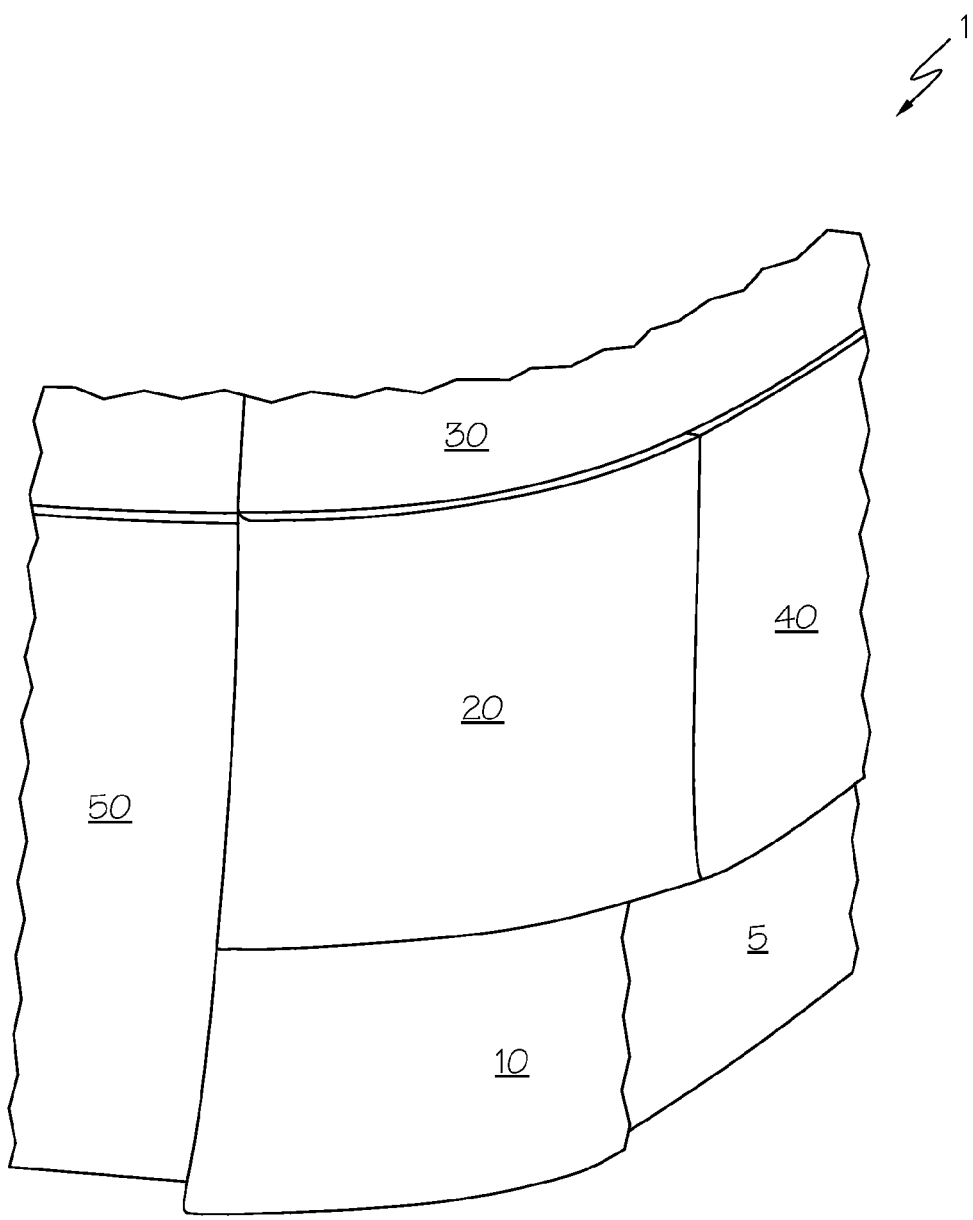
FIG. 1 is a perspective view of a bumper assembly according to one or more embodiments of the present invention.

The embodiments set forth in the drawing are illustrative in nature and not intended to be limiting of the invention defined by the claims. Moreover, individual features of the drawings and invention will be more fully apparent and understood in view of the detailed description.

DETAILED DESCRIPTION

Embodiments of the present invention are directed to improved attachment methods for bumper assemblies and bumper covers, including exemplary methods which include the attachment of an upper bumper cover to fill the gap between the bumper fascia and a lamp unit on the vehicle body.

Figure 4:
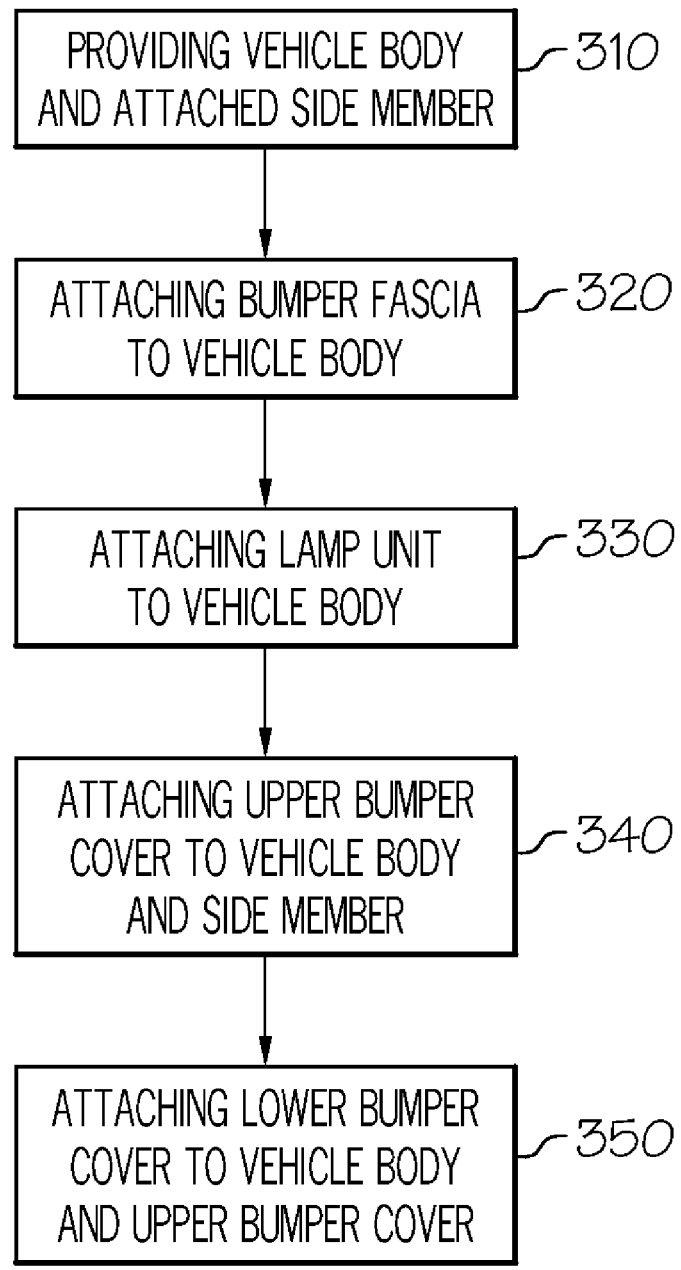
FIG. 4 is a flow chart illustrating the method steps of attaching the upper bumper cover and lower bumper cover to the vehicle assembly according to one or more embodiments of the present invention.

Referring to FIG. 1, an embodiment of a bumper assembly 1 is shown. The bumper assembly 1 is attached to a vehicle body or frame (not shown) as would be familiar to one of ordinary skill in the art. As defined herein, a "vehicle" refers to any car, truck, sports utility vehicle, minivan or any other automobile known to one of ordinary skill in the art. Referring to FIG. 4, an exemplary method of attaching the components of a bumper assembly 1 for a vehicle body is provided. As shown in step 320 and FIG. 4 and as illustrated in FIG. 1, a bumper fascia 5 may be attached to the vehicle body. The bumper fascia 5 may comprise a rear bumper or a front bumper and may also extend at least partially along the passenger side, the driver side, or both sides of the vehicle body.

Further as shown in steps 330 or 340 of FIG. 4 and as illustrated in FIG. 1, the vehicle body may also have a lamp unit 30 or a side member 40 attached, respectively. Referring to step 350 of FIG. 4 and again as illustrated in FIG. 1, an upper bumper cover 20 may be attached to the vehicle body. Although the attachment of the side member 40 and the lamp unit 30 may be attached prior to the attachment of the upper bumper cover 20, it is contemplated that these attachment steps may occur after the attachment of the upper bumper cover 20. As shown in the embodiment of FIG. 1, the upper bumper cover 20 may be positioned at least partially above the bumper fascia 5; however, it is contemplated that the upper bumper cover 20 may also partially cover the bumper fascia 5. Further as shown in FIG. 1, the upper bumper cover 20 may be attached to a side member 40.

Figure 2:
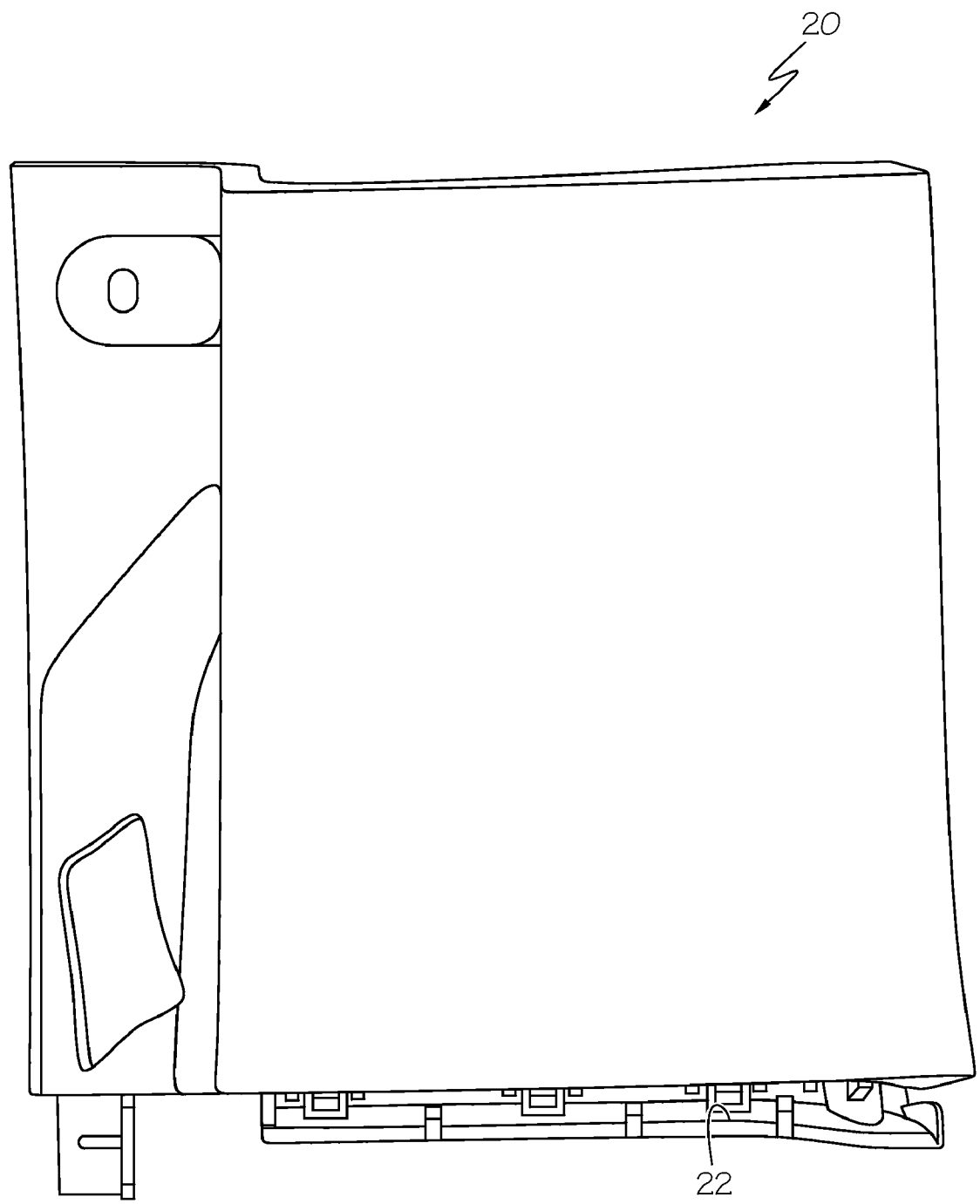
FIG. 2 is a view of the outer surface of the upper bumper cover according to one or more embodiments of the present invention.
Figure 3:
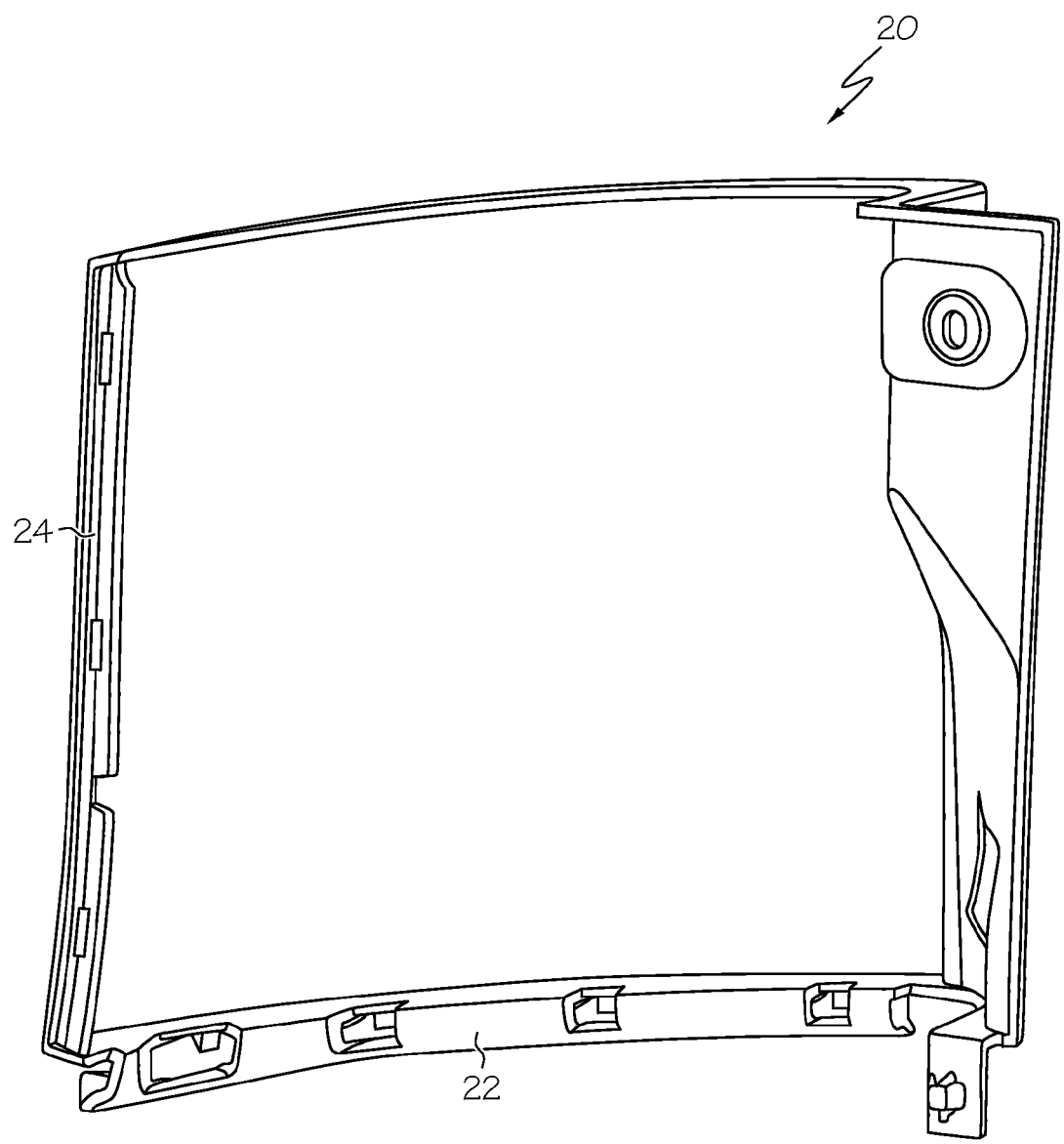
FIG. 3 is a view of the inner surface of the upper bumper cover according to one or more embodiments of the present invention.

Referring to the embodiments of FIGS. 2 and 3, the upper bumper cover 20 may comprise a side retaining member 24 comprising a plurality of slots configured to matingly couple with fastening inserts (not shown) of the side member 40. This facilitates easy attachment of the upper bumper cover 20 to the side member 40. Other mechanisms for coupling the upper bumper cover 20 to the side member 40 and/or the vehicle body (e.g., welding) are also contemplated as part of the present invention. As shown in FIG. 1, the upper bumper cover 20 may be horizontally bounded on opposite sides by a back door 50 and a side member 40.

Referring to step 360 of FIG. 4 and as illustrated in FIG. 1, a lower bumper cover 10 may be attached to the vehicle body via coupling to the bumper fascia 5 and the upper bumper cover 20. As shown in FIG. 1, the lower bumper cover 10 is positioned to at least partially cover the bumper fascia 5 at a location underneath the upper bumper cover 20. The lower bumper cover 10 may be attached to the bumper fascia 5 and the upper bumper cover 20 through various mechanisms familiar to one of ordinary skill in the art. For example, the lower bumper cover 10 may be attached to the bumper fascia 5 via snap fitting. Other processes such as adhesives or welding are also contemplated herein. Referring to FIGS. 2 and 3, the upper bumper cover 20 comprises a lower retaining member 22 having a plurality of slots, which receive fastening inserts (e.g., snap fit connectors) of the lower bumper cover 10 to facilitate attachment of the upper bumper cover 20 to the lower bumper cover 10. After attachment of the lower bumper cover 10, the upper bumper cover 20 is, in the embodiment of FIG. 1, vertically bounded from above by a lamp unit 30, and bounded from below by the lower bumper cover 10. The upper bumper cover 20 and the lower bumper cover 10 may comprise any suitable materials familiar to one of ordinary skill in the art, for example, plastic material, metal material, or combinations thereof.

One aspect of the present inventions includes flexibility of manufacture. Other conventional methods include attaching the lower bumper cover 10 and upper bumper cover 20 together and then installing the attached covers as one piece to the vehicle body. In contrast, the methods described herein allow the lower bumper cover 10 and upper bumper cover 20 to be joined separately to the vehicle body.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these aspects of the invention.

What is claimed is:

1. A method of attaching an upper bumper cover and a lower bumper cover to a vehicle comprising:
    attaching a bumper fascia to a vehicle body;
    attaching the upper bumper cover to the vehicle body at a position at least partially covering the bumper fascia and at a position above the bumper fascia; and
    once the bumper fascia and the upper bumper cover are attached to the vehicle body, then attaching the lower bumper cover to the vehicle body at a position at least partially covering the bumper fascia at a location below the upper bumper cover, wherein the lower bumper cover is coupled to and disposed underneath the upper bumper cover,
    wherein the bumper fascia, the upper bumper cover, and the lower bumper cover are each separately attached to the vehicle body.

2. The method of claim 1 wherein the bumper fascia comprises a rear bumper or a front bumper which extends at least partially along the passenger side, the driver side, or both sides of the vehicle body.

3. The method of claim 1 wherein the lower bumper cover is attached to the bumper fascia via snap fitting.

4. The method of claim 1 wherein the upper bumper cover is horizontally bounded on opposite sides by a back door and a side member, respectively.

5. The method of claim 4 wherein the upper bumper cover comprises a side retaining member comprising a plurality of slots configured to matingly couple with fastening inserts of the side member to facilitate attachment of the upper bumper cover to the side member.

6. The method of claim 1 wherein the upper bumper cover comprises an upper retaining member comprising a plurality of slots which receive fastening inserts of the lower bumper cover to facilitate attachment of the upper bumper cover to the lower bumper cover.

7. The method of claim 6 wherein the fastening inserts are snap fit connectors.

8. The method of claim 1 wherein the upper bumper cover and the lower bumper cover comprise plastic material, metal material, or combinations thereof.

9. A bumper assembly produced by the method of claim 1.

10. The bumper assembly of claim 9 further comprising a combination lamp disposed above the bumper fascia.

11. A method of attaching an upper bumper cover and a lower bumper cover to a vehicle comprising:
    providing a vehicle body, a bumper fascia coupled to the vehicle body, and a side member comprising fastening inserts coupled to the vehicle body;
    attaching the upper bumper cover comprising a lower retaining member and a side retaining member to the vehicle body at a position at least partially covering the bumper fascia and at a position above the bumper fascia, wherein the fastening inserts of the side member are received by the side retaining member of the upper bumper cover to facilitate attachment of the upper bumper cover to the side retaining member; and
    attaching the lower bumper cover comprising fastening inserts to the vehicle body and to the bumper fascia after the bumper fascia and the upper bumper cover are coupled to the vehicle body, wherein the lower bumper cover is positioned to at least partially cover the bumper fascia at a location below the upper bumper cover and the lower bumper cover is coupled to and disposed underneath the upper bumper cover, the fastening inserts of the lower bumper cover being received by the lower retaining member of the upper bumper cover to facilitate attachment of the upper bumper cover to the lower bumper cover,
    wherein the bumper fascia, the upper bumper cover, and the lower bumper cover are each separately attached to the vehicle body.

12. The method of claim 11 further comprising attaching the side member to the vehicle body before attaching the upper bumper cover.

13. The method of claim 11 wherein the bumper fascia comprises a rear bumper or a front bumper which extends at least partially along the passenger side, the driver side, or both sides of the vehicle body.

14. The method of claim 11 wherein the lower bumper cover is attached to the bumper via snap fitting.

15. The method of claim 11 wherein the upper bumper cover is horizontally bounded on the side opposite the side member by a back door.

16. A bumper assembly produced by the method of claim 11.

17. The bumper assembly of claim 16 further comprising a combination lamp disposed above the bumper fascia.

18. The method of claim 1 wherein once the bumper fascia and the upper bumper cover are attached to the vehicle body, then attaching the lower bumper cover to the vehicle body by attaching the lower bumper cover to both the bumper fascia and the upper bumper cover.

19. The method of claim 7 wherein the plurality of slots of the upper bumper cover and the fastening inserts of the lower bumper cover locate and lock the lower bumper cover relative to the upper bumper cover.

20. The method of claim 1 further comprising attaching the upper bumper cover to a side member.

* * * * *